No. 882,251. PATENTED MAR. 17, 1908.
W. A. KNIPE.
CEMENTING MACHINE.
APPLICATION FILED OCT. 1, 1907.

Witnesses:
H. B. Davis
Cynthia Doyle.

Inventor:
Wm. A. Knipe

UNITED STATES PATENT OFFICE.

WILLIAM A. KNIPE, OF WARD HILL, MASSACHUSETTS.

CEMENTING-MACHINE.

No. 882,251.  Specification of Letters Patent.  Patented March 17, 1908.

Application filed October 1, 1907. Serial No. 395,340.

*To all whom it may concern:*

Be it known that I, WILLIAM A. KNIPE, of Ward Hill, county of Essex, State of Massachusetts, have invented an Improvement in Cementing-Machines, of which the following description, in connection with the accompanying drawings, is a specification, like characters on the drawings representing like parts.

This invention relates to cementing machines which are especially designed to use in cementing parts of shoes, such as the cloth linings or doublers thereof, and in which a flat, cement-carrying surface is provided on which the parts to be cemented are laid.

Prior to the present invention I have employed a rubber belt which was carried about three rolls, so as to provide a work-receiving surface, and which was drawn over the outlet of a tank to receive the coating of cement. Said machine was somewhat complicated and the life of the rubber belt was short. Furthermore, considerable labor was involved in preventing the parts from becoming clogged with cement.

My invention has for its object to provide a simple form of cementing machine in which a cement-carrying surface is provided, on which the work may be laid to be cemented, which is simple in construction and provided with few working parts, which will wear practically indefinitely and which may be easily kept in order. I accomplish this object by providing a table which is rotated in such a position that it is carried below and above the level of a body of liquid cement.

Figure 1:
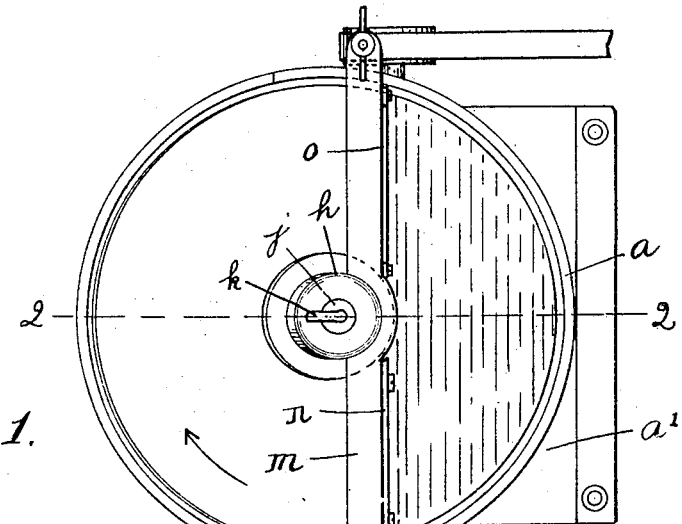
Figure 2:
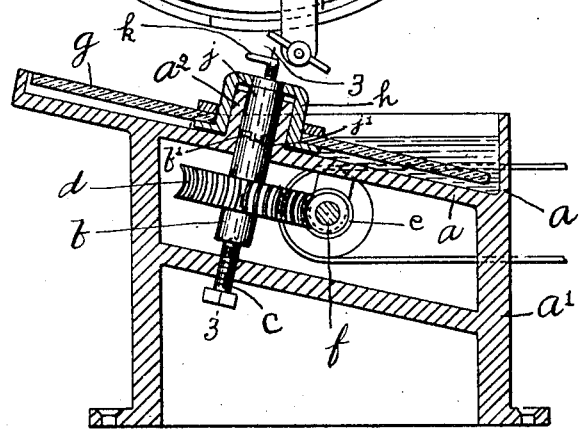
Figure 3:
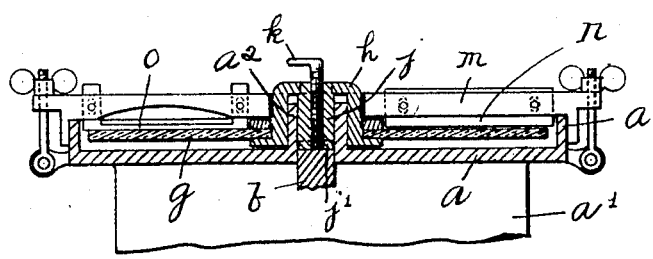
Figure 4:

For a more complete understanding of my invention, reference is made to the accompanying drawings, in which, Figure 1 is a plan view of a cementing machine made according to my invention. Fig. 2 is a vertical sectional view on the line 2—2 of Fig. 1. Fig. 3 is a vertical sectional view on the line 3—3 of Fig. 2. Fig. 4 is a detail view of the table holding shafts.

In the drawing $a$ indicates a tank which is mounted on suitable supports $a'$, said tank having a circular bottom, which is somewhat inclined from the horizontal, and a circular side-wall, the lower half of which has a horizontal upper edge. Said bottom is provided with a central aperture surrounded by a circular wall $a^2$, which extends perpendicularly to the bottom $a$ of the tank, and provides a bearing for a shaft $b$, which is journaled at its upper end therein, and at its lower end upon a step-bearing screw $c$. Said shaft $b$ is provided with a worm gear $d$, with which a worm $e$ on a driving shaft $f$ is adapted to mesh, so that said shaft $b$ may be driven therefrom.

A flat circular table or disk $g$, preferably of thick, heavy glass, is provided, said table being of slightly less diameter than that of the walls of the tank and extending over practically the entire bottom thereof. Said table is mounted on a supporting thimble $h$, which extends through the middle of the table and is clamped thereto by means of a flange and nut connection, or similar means. Said thimble incloses the bearing $a^2$ and has a shaft $j$ secured thereto which extends partly through, and is fitted to rotate in said bearing $a^2$. Said shaft $j$ is also of sufficient length to engage the upper end of shaft $b$ while supporting the thimble with its lower end out of engagement with the upper end of the bearing, so that the table is thus supported on the end of shaft $b$. Said shaft $j$ is provided with clutch teeth $j'$ at its lower end, which are adapted to engage corresponding recesses $b'$ in the upper end of the shaft $b$, when the parts are in operative position, so that, when shaft $b$ is rotated, it will cause shaft $j$ and the table $g$ also to be rotated. Said shaft is provided with a longitudinal bore in which a lowering screw $k$ is threaded, said screw being adapted to be turned into engagement with shaft $b$ to raise the table, and providing means by which the table may be easily lowered into position.

A cross bar $m$ is removably connected at opposite ends to the sides of the tank and a regulating-plate $n$ is supported thereby which extends approximately radially of the table with its lower edge in close proximity thereto. Said plate $n$ is adjustably connected to said bar by a slot and screw connection, or other suitable means, so that the distance from the plate to the table may be varied. A scraper knife $o$ is also adjustably secured to the bar $m$ at the opposite side of the table from the plate $n$ and is adapted to be held so that its edge bears against the surface of the table.

In practice the tank is filled with cement up to such level that nearly one-half the table is constantly submerged therein, so that when the table is rotated, the entire table, except its middle portion, will be carried beneath the surface of the liquid in making a complete rotation. The surface of the table will thus become thoroughly coated with the cement so that the operator may lay the parts to be cemented upon any portion of the surface of the table during the time that it is being carried above the level of the cement. As too thick a coating of cement would thus be carried by the table, if means were not provided to regulate the same, I employ the regulating plate $n$, which is adjusted so that its edge is held close and parallel to the surface of the table, in a position a short distance above the liquid level. The table being rotated in the direction of the arrow in Fig. 1, the plate $n$ will remove the surplus cement from the surface thereof, as it is moved beneath the plate, so that the exposed portion of said surface will be continuously supplied with a thin covering of cement.

As the cement which is employed is a heavy, slow-flowing liquid and, as the table is flat and so held that its surface is adjacent the horizontal, when the table is rotated, the cement accumulates in a sort of wave against the back-side of the regulating plate $n$, the depth of which increases from the center outward, by reason of centrifugal action. The side of the tank adjacent the plate, which is also located closely adjacent the edge of the table, as shown, acts as a dam to hold the outer end of the wave of cement, so that after the cement has become exhausted from the tank, so that the table no longer passes below the surface of the liquid, the cement will be fed to the surface of the table from the wave of cement, above referred to, by the passage of the table beneath it. The plate $n$, therefore, is as much a cement holding and distributing plate as it is a regulating plate, and, by making the same of considerable width, as shown, the plate is thereby enabled to hold a sufficient quantity of cement to supply the surface of the table for a considerable length of time.

As there is some tendency for the cement to harden and accumulate on the surface of the table, I provide the scraper knife $o$, which is adjusted to bear against the surface of the table at any convenient point adjacent or below the liquid level, at the opposite side of the table from the plate, or at some point which will not interfere with the use and operation of the machine. The knife $o$ is made sufficiently narrow and so supported as to permit the cement removed by it to flow easily thereover.

In case it becomes necessary to raise the table it is merely necessary to screw down the bolt, and, if it is desired to remove the table from the tank, it is merely necessary to lift it vertically therefrom, so that the parts may be easily freed of cement.

Having thus described my invention, what I claim as new and desire to secure by Letters Patent is:—

1. A cementing machine comprising a support and means for rotating the same, a table having an annular, work-receiving surface on its upper side and centrally mounted, with relation to said surfaces, on said support in position to hold said surface adjacent the horizontal, and a cement holding and distributing gate extending across said surface with its lower edge at a uniform distance therefrom, substantially as described.

2. A cementing machine comprising a support and means for rotating the same, a circular table having an approximately flat work-receiving surface on its upper side and centrally mounted on said support in position to hold said surface adjacent the horizontal, and a cement holding and distributing gate extending from a point adjacent the center to the edge of said table with its lower edge at a uniform distance from said surface, substantially as described.

3. A cementing machine comprising a support and means for rotating the same, a table having an annular, work-receiving surface on its upper side and centrally mounted, with relation to said surface, on said support in position to hold said surface adjacent the horizontal, a cement holding and distributing gate extending across said surface with its lower edge at a uniform distance therefrom, and a retaining wall extending from a point adjacent the end of said gate in a direction opposite the direction of rotation of said support, substantially as described.

4. A cementing machine comprising a support and means for rotating the same, a circular table having an approximately flat work-receiving surface on its upper side and centrally mounted on said support in position to hold said surface adjacent the horizontal, a tank supported beneath said table having sides disposed adjacent and beyond the edge thereof, and a cement holding and distributing gate extending from a point adjacent the center of said table to the edge thereof, substantially as described.

5. A cementing machine, comprising a tank having a bearing extending through the bottom thereof, a shaft mounted to rotate in said bearing, a table axially supported on the upper end of said shaft and axially movable into and out of driving engagement therewith, means for supplying the upper surface of said tank with cement, and means below the tank for driving said shaft, substantially as described.

6. A cementing machine, comprising a tank, and a flat, circular table mounted to rotate therein about an axis sufficiently inclined from the vertical to carry a portion thereof below the liquid level in the tank, a distributing and leveling gate extending radially of said table adjacent the surface thereof and means for rotating said table, substantially as described.

In testimony whereof, I have signed my name to this specification, in the presence of two subscribing witnesses.

WILLIAM A. KNIPE.

Witnesses:
L. H. HARRIMAN,
H. B. DAVIS.